United States Patent
Ma et al.

(10) Patent No.: US 10,565,713 B2
(45) Date of Patent: Feb. 18, 2020

(54) IMAGE PROCESSING APPARATUS AND METHOD

(71) Applicant: SAMSUNG ELECTRONICS CO., LTD., Suwon-si (KR)

(72) Inventors: Lin Ma, Beijing (CN); Deheng Qian, Beijing (CN); DongKyung Nam, Yongin-si (KR); Guangwei Wang, Beijing (CN); Jingu Heo, Yongin-si (KR); Jingtao Xu, Beijing (CN); Mingcai Zhou, Beijing (CN); Qiang Wang, Beijing (CN); Zairan Wang, Beijing (CN); Zhihua Liu, Beijing (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 62 days.

(21) Appl. No.: 15/794,677

(22) Filed: Oct. 26, 2017

(65) Prior Publication Data
US 2018/0137630 A1 May 17, 2018

(30) Foreign Application Priority Data

Nov. 15, 2016 (CN) .......................... 2016 1 1025103
May 11, 2017 (KR) ........................ 10-2017-0058547

(51) Int. Cl.
*G06T 7/246* (2017.01)
*G06T 7/40* (2017.01)
(Continued)

(52) U.S. Cl.
CPC ................ *G06T 7/248* (2017.01); *G06K 9/46* (2013.01); *G06K 9/6202* (2013.01);
(Continued)

(58) Field of Classification Search
CPC .. G06T 7/248; G06T 7/74; G06T 7/40; G06T 7/251; G06T 2207/10016; G06K 9/6202;
(Continued)

(56) References Cited

U.S. PATENT DOCUMENTS 7,567,346 B2 7/2009 Fomitchov et al.
7,571,097 B2 8/2009 Acero et al.
(Continued)

FOREIGN PATENT DOCUMENTS

KR 10-1439037 B1 9/2014

OTHER PUBLICATIONS

Xi Peng et al., "Constructing the L2-Graph for Robust Subspace Learning and Subspace Clustering", IEEE and Huajin Tang, IEEE transactions on cybernetics 47.4, 2017, pp. 1-14. (fourteen (14) pages total).
(Continued)

*Primary Examiner* — John W Lee
(74) *Attorney, Agent, or Firm* — Sughrue Mion, PLLC

(57) ABSTRACT

An image processing apparatus includes a calculator configured to calculate a respective position offset for each of a plurality of candidate areas in a second frame based on a position of a basis image in a first frame and a determiner configured to determine a final selected area that includes a target in the second frame based on a respective weight allocated to each of the plurality of candidate areas and the calculated respective position offset.

10 Claims, 11 Drawing Sheets

(51) Int. Cl.
  *G06T 7/73* (2017.01)
  *G06K 9/62* (2006.01)
  *G06K 9/46* (2006.01)

(52) U.S. Cl.
  CPC ......... *G06K 9/6215* (2013.01); *G06K 9/6218* (2013.01); *G06T 7/251* (2017.01); *G06T 7/40* (2013.01); *G06T 7/74* (2017.01); *G06K 2209/21* (2013.01); *G06T 2207/10016* (2013.01)

(58) Field of Classification Search
  CPC ...... G06K 9/46; G06K 9/6218; G06K 9/6215; G06K 2209/21
  See application file for complete search history.

(56) References Cited

U.S. PATENT DOCUMENTS

| | | | |
|---|---|---|---|
| 7,724,784 B2 | 5/2010 | Perng et al. | |
| 2010/0246997 A1* | 9/2010 | Porikli | ..................... G06T 7/251 382/291 |
| 2014/0105304 A1* | 4/2014 | Bian | .................. H04N 5/23254 375/240.16 |
| 2016/0196665 A1* | 7/2016 | Abreu | ..................... G06T 11/00 345/427 |

OTHER PUBLICATIONS

Chong You et al., "Scalable Sparse Subspace Clustering by Orthogonal Matching Pursuit", IEEE Conference on Computer Vision and Pattern Recognition, 2016. (ten (10) pages total).

C. Bouveyron et al., "Object Localization by Subspace Clustering of Local Descriptors", Computer Vision, Graphics and Image Processing, Springer Berlin Heidelberg, 2006. (ten (10) pages total).

Vasileios Zografos et al., "Discriminative Subspace Clustering", Proceedings of the IEEE Conference on Computer Vision and Pattern Recognition, 2013. pp. 2107-2114, (eight (8) pages total).

Sheng Li et al., "Temporal Subspace Clustering for Human Motion Segmentation", Proceedings of the IEEE International Conference on Computer Vision, 2015, pp. 4453-4461. (nine (9) pages total).

Amir Ahmad et el., "A k-means type clustering algorithm for subspace clustering of mixed numeric and categorical datasets", Pattern Recognition Letters, vol. 32, 2011, pp. 1062-1069, Elsevier. (eight (8) pages total).

Vishal M. Patel et al., "Latent Space Sparse Subspace Clustering", Proceedings of the IEEE International Conference on Computer Vision, 2013, pp. 225-232. (eight (8) pages total).

Luis Guerra, "Semi-supervised subspace clustering and applications to neuroscience", Departamento De Inteligencia Artificial, Diss. Informatica, 2012. (one hundred ninety-three (193) pages total).

\* cited by examiner

Sample frame

IMAGE PROCESSING APPARATUS AND METHOD

CROSS-REFERENCE TO RELATED APPLICATION

This application claims priority from Chinese Patent Application No. 201611025103.9, filed on Nov. 15, 2016 in the State Intellectual Property Office of the People's Republic of China, and Korean Patent Application No. 10-2017-0058547, filed on May 11, 2017 in the Korean Intellectual Property Office, the disclosures of which are incorporated herein by reference in their entireties.

BACKGROUND

1. Field

Methods and apparatuses consistent with example embodiments relate to image processing technology.

2. Description of the Related Art

Portable terminals such as a smartphone, a tablet personal computer (PC) and a lap top computer are being used widely. Further, it has become possible to continuously capture a target using a capturing device in the portable terminal. In order to acquire a clear frame in a continuously captured video file, a process of tracking a target and adjusting a focus for the target may be required.

A target tracking method may include, for example, a method of performing a selective search on a predetermined bounding box of a plurality of areas and a method of tracking a target in a frame using a particle filter that predicts a stochastic movement of each point.

SUMMARY

Example embodiments may address at least the above problems and/or disadvantages and other disadvantages not described above. Further, the example embodiments are not required to overcome the disadvantages described above, and an example embodiment may not overcome any of the problems described above.

According to an aspect of an example embodiment, there is provided an image processing apparatus including a processor configured to implement a calculator configured to calculate a respective first position offset for each of a plurality of candidate areas in a second frame based on a position of a basis image in a first frame and a determiner configured to determine a final selected area that includes a target in the second frame based on a respective weight allocated to each of the plurality of candidate areas and the calculated respective first position offset.

The determiner may be further configured to determine each respective weight based on a respective position of each corresponding one of the plurality of candidate areas in the second frame.

The calculator may be further configured to calculate a plurality of second position offsets by applying a feature regression matrix to each of the plurality of candidate areas and to calculate a target position offset for tracking the target by applying each respective weight to each corresponding one of the plurality of second position offsets.

The calculator may be further configured to calculate a plurality of second position offsets for a first candidate area by using a plurality of predetermined feature regression matrices, and to calculate the first position offset that corresponds to the first candidate area by using an average value of the plurality of second position offsets. The plurality of predetermined feature regression matrices may be determined based on a respective third position offset that corresponds to a respective feature point of each of a plurality of sample frames and a feature point in the basis image.

The image processing apparatus may further include an extractor configured to determine an initial selected area associated with the target in the second frame based on the basis image in the first frame and to extract the plurality of candidate areas based on the determined initial selected area. The extractor may be further configured to calculate an overall position offset between the first frame and the second frame and to determine the initial selected area based on the calculated overall position offset and information that relates a position at which the target is present in the basis image.

The extractor may be further configured to extract, from the second frame, respective projection points that correspond to feature points in the basis image and to determine the overall position offset by using a respective texture value of each of a plurality of first points in a predetermined range and the extracted projection points. The extractor may be further configured to extract the plurality of first points in the predetermined range based on the extracted projection points, to determine matching points that correspond to the feature points based on a respective similarity between a texture value of each corresponding one of the extracted plurality of first points and a texture value of each of the feature points, and to determine the overall position offset by comparing a respective position of each of the feature points with a respective position of each of the matching points.

The image processing apparatus may further include a storage configured to store the second frame in which the final selected area is determined and to update, when a number of stored frames is greater than or equal to a threshold, the basis image based on a target tracking result value of the stored frames.

According to another aspect of an example embodiment, there is also provided an image processing method including calculating a respective similarity between a positive sample associated with a target and each of a plurality of candidate areas and determining a final selected area that includes the target in a frame based on each calculated similarity.

The calculating of the respective similarity may include comparing a feature of the positive sample included in a sparse subspace clustering (SSC) model to a feature of a respective subarea in each of the plurality of candidate areas.

The calculating of the respective similarity may include calculating a similarity that corresponds to a first candidate area based on a sum of similarities between a plurality of subareas included in the first candidate area.

The SSC model may be determined by using a plurality of sample frames based on a Euclidean distance between the positive sample associated with the target and a negative sample associated with a feature of an area that is adjacent to the final selected area that includes the target.

The image processing method may further include comparing a similarity between the positive sample and the final selected area of the frame to an average value of similarities between the positive sample and previous frames and storing the frame based on a comparison result. The image processing method may further include comparing a number of stored frames to a threshold and updating an SSC model by using the stored frames as sample frames based on the comparison result.

According to still another aspect of an example embodiment, there is also provided an image processing apparatus including an extractor configured to extract a plurality of candidate areas from an input frame by using a basis image, a first calculator configured to calculate a target position offset for tracking respective feature points included in each of the plurality of candidate areas, a second calculator configured to calculate a respective similarity between each of the plurality of candidate areas and a positive sample associated with a target, and a determiner configured to determine a final selected area that includes the target by applying a first weight to the target position offset and applying a respective second weight to each respective similarity between the corresponding one of the plurality of candidate areas and the positive sample.

The first calculator may be further configured to calculate a plurality of first position offsets by applying a feature regression matrix to each corresponding one of the plurality of candidate areas, and to calculate the target position offset by applying a weight to the plurality of first position offsets.

The second calculator may be further configured to calculate each respective similarity based on a hybrid sparse subspace clustering (HSSC) model that is determined by using the positive sample associated with the target and a negative sample associated with an area that is adjacent to the final selected area that includes the target.

According to yet another aspect of an example embodiment, there is also provided a target tracking method including an acquiring a candidate area associated with a target in a current frame and acquiring a final selected area by performing a feature regression on the acquired candidate area.

The acquiring of the candidate area may include determining information that relates to an initial selected area of the target of the current frame based on a basis image of the target of a prestored frame and acquiring information that relates to a first set number of candidate areas around the initial selected area of the target.

The acquiring of the final selected area may include performing regression with respect to information that relates to each candidate area acquired based on a feature regression matrix and determining the final selected area of the target based on information obtained after a total regression of the candidate area acquired by performing the regression.

The acquiring of the final selected area may further include performing the feature regression and a feature assessment on the acquired candidate area.

According to a further aspect of an example embodiment, there is also provided a target tracking method including acquiring a candidate area associated with a target of a current frame and acquiring a final selected area by performing a feature assessment on the acquired candidate area, wherein the feature assessment is performed based on an SSC model.

The acquiring of the final selected area may include performing an assessment on information that relates to each candidate area acquired using the SSC model and determining the final selected area of the target based on information that relates to a candidate area that corresponds to a maximal assessment value acquired as a result of the assessment.

The performing of the assessment may include performing an assessment on an image feature of a respective sub-candidate area of each candidate area acquired using the SSC model, determining an assessment value of the image feature of the candidate area based on an assessment value of the image feature of the corresponding sub-candidate area, and determining a maximal assessment value from the assessment value of the image feature of the candidate area.

BRIEF DESCRIPTION OF THE DRAWINGS

The above and/or other aspects will be more apparent by describing certain example embodiments with reference to the accompanying drawings, in which.

DETAILED DESCRIPTION

Figure 1:
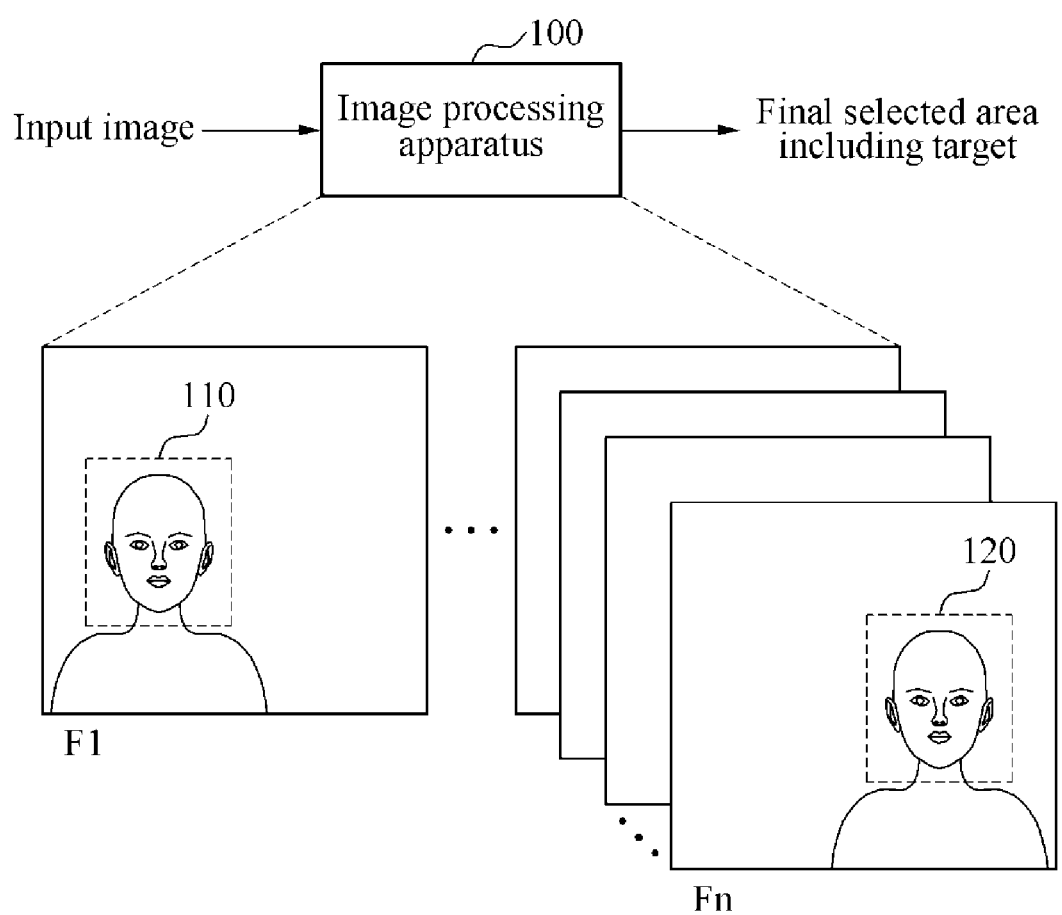
FIG. 1 is a diagram illustrating an operation of an image processing apparatus, according to an example embodiment.

Example embodiments are described in greater detail herein with reference to the accompanying drawings.

In the following description, like drawing reference numerals are used for like elements, even in different drawings. The matters defined in the description, such as detailed construction and elements, are provided to assist in a comprehensive understanding of the example embodiments. However, it will be apparent to persons having ordinary skill in the art that the example embodiments can be practiced without those specifically defined matters. Also, well-known functions or constructions are not described in detail since they would obscure the description with unnecessary detail.

In addition, the terms such as "unit", "-er (-or)", and "module" described in the specification refer to an element for performing at least one function or operation, and may be implemented in hardware, software, or the combination of hardware and software.

In the following description, like drawing reference numerals are used for like elements, even in different drawings. Various alterations and modifications may be made to the example embodiments, some of which will be illustrated in detail in the drawings and detailed description. The matters defined in the description, such as detailed construction and elements, are provided to assist in a comprehensive understanding of the example embodiments. However, it should be understood that these example embodiments are not construed as limited to the illustrated forms and include all changes, equivalents or alternatives within the idea and the technical scope of this disclosure. It will be apparent to persons having ordinary skill in the art that the example embodiments can be practiced without those specifically defined matters. Also, well-known functions or constructions are not described in detail since they would obscure the description with unnecessary detail.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Terms such as first, second, A, B, (a), (b), and the like may be used herein to describe components. Each of these terminologies is not used to define an essence, order or sequence of a corresponding component but used merely to distinguish the corresponding component from other component(s). For example, a first component may be referred to a second component, and similarly the second component may also be referred to as the first component.

The terminology used herein is for the purpose of describing particular examples only, and is not to be used to limit the disclosure. As used herein, the terms "a," "an," and "the" are intended to include the plural forms as well, unless the context clearly indicates otherwise. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

FIG. 1 is a diagram illustrating an operation of an image processing apparatus, according to an example embodiment. An image processing apparatus 100 may be implemented as a computing device. The image processing apparatus 100 may be implemented as, for example, at least one software module, at least one hardware module such as a microprocessor or integrated circuit, or combinations thereof such as a processor executing a software program or instructions. Referring to FIG. 1, the image processing apparatus 100 may receive an input image and determine a final selected area that includes a target in the received input image. Hereinafter, the target may indicate an object that is tracked in image data as a region of interest of a user. The target may be designated as, for example, an eye and/or a nose of a predetermined user in a frame of an overall image. Also, the target may be designated as a position of a predetermined player in a sport image in which a plurality of players is moving.

To determine the final selected area that includes the target, the image processing apparatus 100 may use a basis image that has previously been stored. Hereinafter, the basis image may indicate an area verified to have a target in a predetermined frame. The basis image may be stored in any of various forms, for example, a polygonal area, an oval area, and an irregular-shaped area connecting a plurality of pixel points. The polygonal area may include, for example, a triangular area, a pentagonal area, a five-pointed star area, and a hexagonal area.

The image processing apparatus 100 may determine a final selected area 110 in the first frame F1 based on a position of the basis image. Similarly, the image processing apparatus 100 may determine a final selected area 120 in an nth frame Fn. The image processing apparatus 100 may update the basis image based on a number of frames in which a final selected area is determined. A process of selecting a basis image and updating the selected basis image will be also described in detail below.

Figure 2:
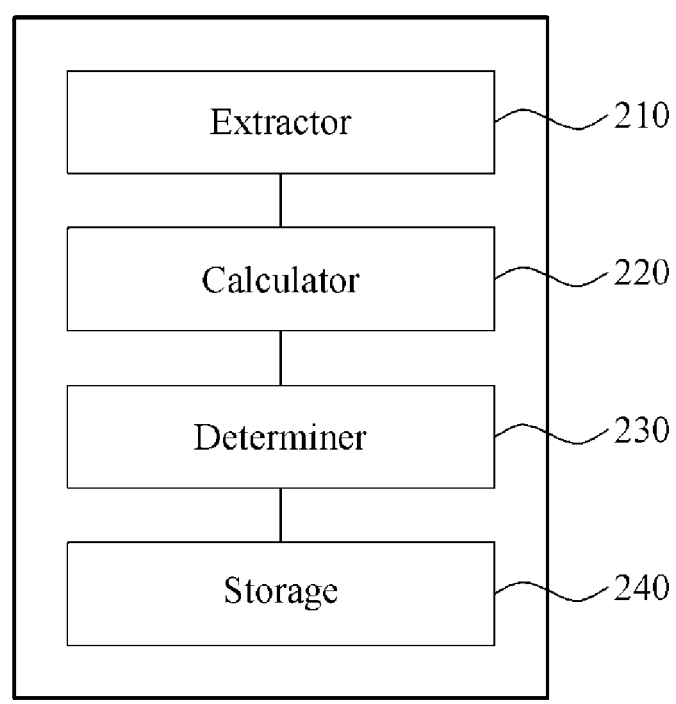
FIG. 2 is a block diagram illustrating an image processing apparatus, according to an example embodiment.

FIG. 2 is a block diagram illustrating an image processing apparatus, according to an example embodiment. Referring to FIG. 2, an image processing apparatus 200 may include an extractor 210, a calculator 220, a determiner 230, and a storage 240. The extractor 210, the calculator 220, and the determiner 230 may be implemented by a processor. The extractor 210 may determine an initial selected area associated with a target in a second frame based on a basis image in a first frame. For example, the first frame may be a predetermined frame included in an overall input image. In addition, the first frame may be a frame in which information that relates to the basis image is stored in advance. The basis image may be an image of an area that includes the target in the first frame. For example, the information that relates to the basis image may be information associated with feature points included in the basis image. Further, the second frame may be a frame to be input to the image processing apparatus 200 after the first frame in the overall input image.

The extractor 210 may extract a plurality of candidate areas based on the initial selected area determined in the second frame. For example, the extractor 210 may extract a predetermined number of candidate areas based on the initial selected area associated with the target.

The calculator 220 may calculate a respective position offset for each of the plurality of candidate areas in the second frame based on a position of the basis image in the first frame. The calculator 220 may calculate each respective position offset by performing a feature regression on each corresponding one of the plurality of candidate areas. Hereinafter, the feature regression may indicate a process of tracking an offset of a position to which feature points in the basis image are relocated with respect to each of the candidate areas.

The calculator 220 may calculate a plurality of position offsets by applying a pre-trained feature regression matrix to each of the plurality of candidate areas. Hereinafter, the feature regression matrix may indicate a matrix that defines respective differences between positions of feature points in a basis image and corresponding positions of feature points in a candidate area. The image processing apparatus 200 may compare a position of the basis image that includes the target to a corresponding position of each of the candidate areas based on the feature regression matrix. Based on a comparison result, the image processing apparatus 200 may track a candidate area that has a most similar feature to that of the basis image.

The calculator 220 may calculate a target position offset for tracking the target by applying a respective weight to each of the plurality of position offsets.

The determiner 230 may determine a final selected area that includes the target in the second frame based on the respective weight allocated to each corresponding one of the plurality of candidate areas and the calculated position offset. The determiner 230 may determine each respective weight based on a position at which each of the plurality of candidate areas is present in the second frame.

The storage 240 may store the second frame that has the determined final selected area in a memory included in the image processing apparatus 200. When a number of stored frames is greater than or equal to a threshold, the storage 240 may update the basis image based on a target tracking result value of the stored frames.

Further, the storage 240 may update the feature regression matrix by using a newly stored frame. The storage 240 may replace a feature regression matrix that has not been updated for the longest period of time with a new feature regression matrix.

Figure 3A:
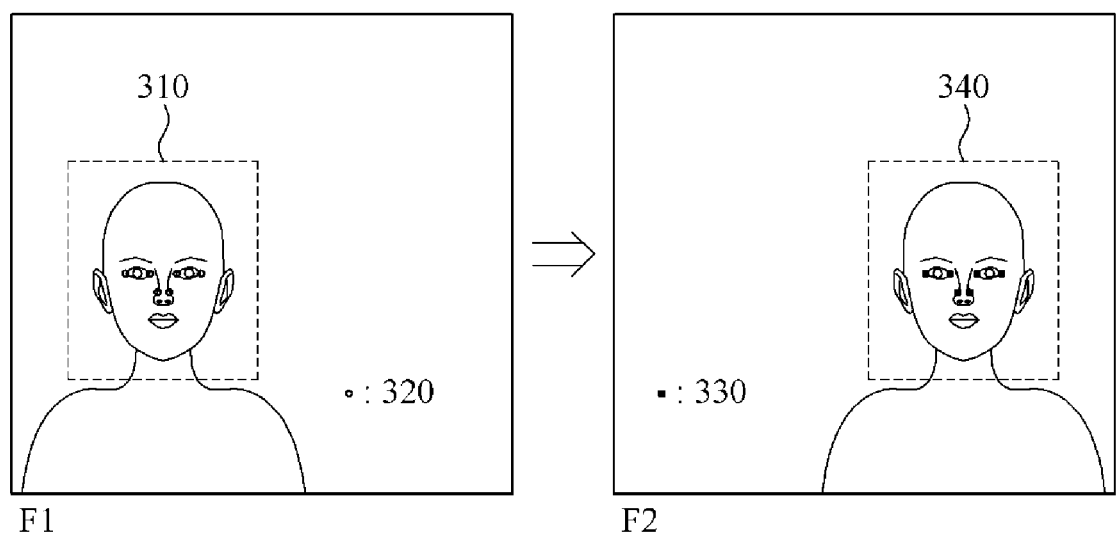
FIGS. 3A and 3B are diagrams illustrating a process of determining an initial selected area based on a basis image by using the image processing apparatus of FIG. 2.
Figure 3B:
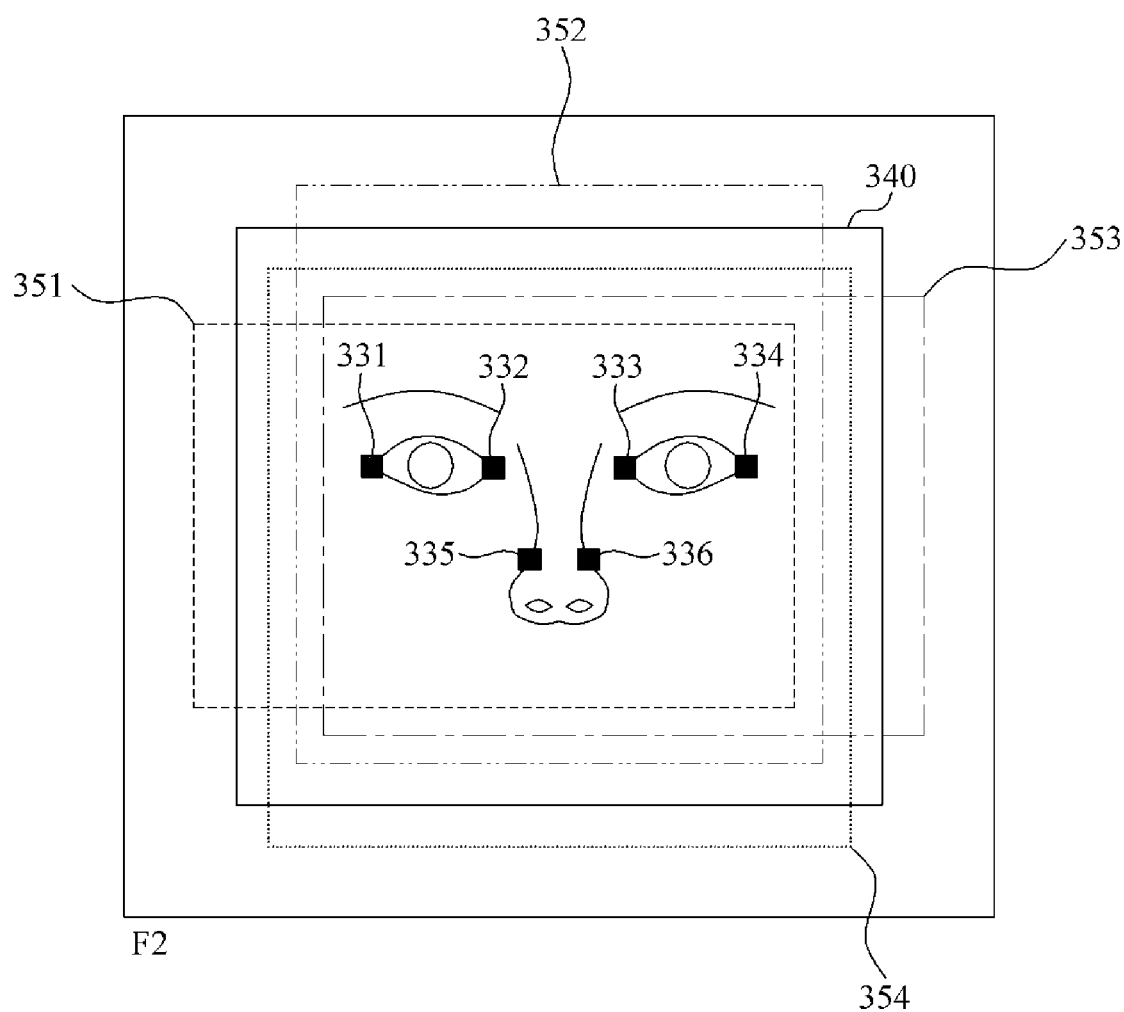

FIGS. 3A and 3B are diagrams illustrating a process of determining an initial selected area based on a basis image by using the image processing apparatus 200 of FIG. 2. Referring to FIG. 3A, the image processing apparatus 200 may determine an initial selected area 340 in a second frame F2 which has been newly input by using a first frame F1 which had previously been stored. The extractor 210 may determine a plurality of matching points 330 in the second frame F2 based on feature points 320 in a basis image 310. Hereinafter, a feature point may indicate a point to be identified by an image processing apparatus among pixel points in a frame. The feature point may be defined as points, such as, for example, a face contour point and a face element point such as an eye, a nose, a mouth, and the like of a target.

The extractor 210 may extract a plurality of projection points in the second frame F2 of the input image by using the feature points 320 of the prestored first frame F1. Hereinafter, a projection point may indicate a pixel point in a second frame that corresponds to at least one of the feature points 320. The extractor 210 may extract pixel points included in a predetermined range based on the projection point. For example, the extractor 210 may extract points that correspond to a 3×3 matrix as the pixel points based on a position of the projection point. The 3×3 matrix is merely an example, and example embodiments are not limited to this example. In addition, pixel points in various ranges may be extracted in accordance with a selection of a person having ordinary skill in the art.

The extractor 210 may compare a respective texture value of each of the feature points 320 to a respective texture value of each corresponding one of the extracted pixel points and determine matching points in the second frame based on a comparison result. For example, the extractor 210 may determine pixel points that have the highest similarity with respect to the texture value of the feature points 320 to be the matching points of the second frame.

The extractor 210 may calculate a texture gradient value of the extracted pixel points and the projection point and extract pixel points that correspond to the calculated texture gradient being greater than a predetermined threshold as a candidate matching point. Further, the extractor 210 may compare the texture value of the feature points 320 to the texture value of the candidate matching points and determine the matching points 330 in the second frame based on a comparison result. The extractor 210 may determine pixel points that have the highest similarity with respect to the texture value of the feature points 320 to be the matching points 330 in the second frame. As such, the image processing apparatus may select an initial selected area for tracking a target based on a protection point, thereby increasing accuracy and efficiency of the target tracking.

The extractor 210 may compare respective positions of the matching points 330 in the second frame $F_2$ to the positions of the feature points 320 in the first frame $F_1$ and determine an overall position offset associated with the second frame $F_2$ based on a comparison result.

The extractor 210 may determine the overall position offset associated with the second frame $F_2$ of the input image by using a respective weight that corresponds to each of the feature points 320. The extractor 210 may calculate position offsets between the feature points 320 and the matching points 330 and calculate a weighting average value obtained by applying each respective weight to the calculated position offsets as the overall position offset associated with the second frame $F_2$. The respective weight may be determined based on a similarity between the respective texture value of each of the feature points 320 and the respective texture value of each corresponding one of the matching points 330.

The extractor 210 may calculate area information of the initial selected area 340 in the second frame $F_2$ based on area information of the basis image 310 in the first frame $F_1$ and the calculated overall position offset. The area information may include at least one of, for example, image data in an area, size information of the area, position information of the area in a frame, and feature points in the area.

The extractor 210 may estimate target position information in the second frame $F_2$ based on the position information of the basis image 310 in the first frame $F_1$ and the overall position offset associated with the second frame $F_2$. The target position information may indicate a position at which the basis image 310 is present in the second frame $F_2$. Further, the extractor 210 may determine the initial selected area 340 of the target in the second frame $F_2$ based on the estimated target position information. For example, the initial selected area 340 and the basis image 310 may be the same in size.

Referring to FIG. 3B, the image processing apparatus 200 may extract a plurality of candidate areas 351, 352, 353, and 354 based on the extracted initial selected area 340. The extractor 210 may sample a candidate area $X_i$ (i=1, ..., N, N being a positive integer) in an area that is adjacent to the initial selected area 340 and acquire area information associated with the candidate area $X_i$. The area information may include, for example, information that relates to feature points 331, 332, 333, 334, 335, and 336 included in the area, position information, and size information of the candidate area $X_i$.

When the basis image includes at least two basis sub-images, the extractor 210 may acquire information that relates to a respective sub-candidate area that corresponds to each of the basis sub-images based on the extracted candidate area. For example, a single basis image that includes four basis sub-images may be stored in a memory. In this example, the extractor 210 may extract a respective sub-candidate area that corresponds to each of the four basis sub-images and acquire information that corresponds to each sub-candidate area.

Figure 4:
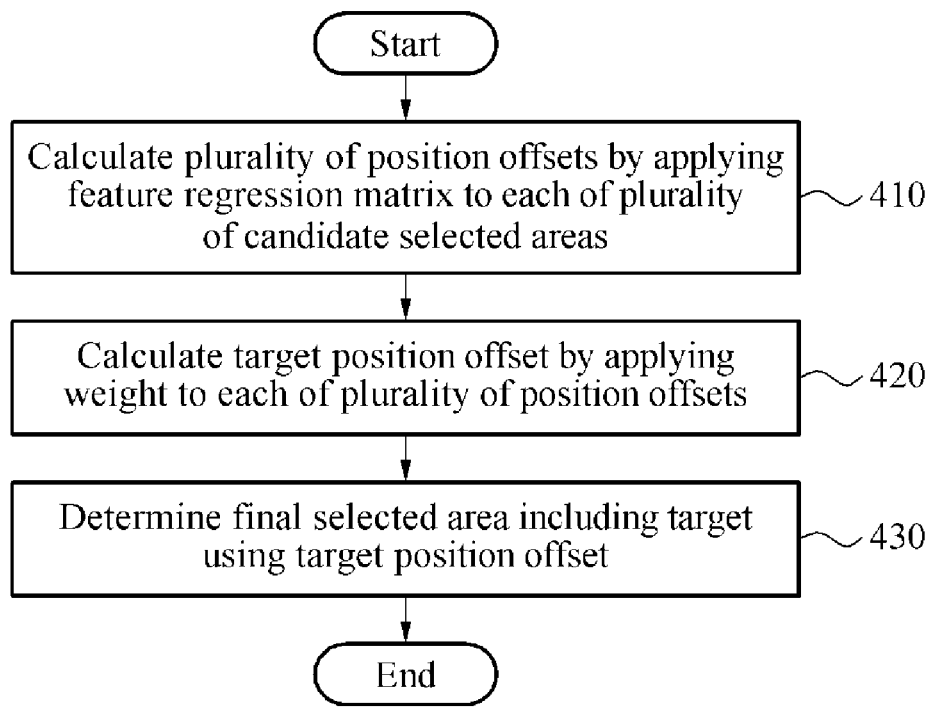
FIG. 4 is a flowchart illustrating a process of determining a final selected area that includes a target by using the image processing apparatus of FIG. 2.

FIG. 4 is a flowchart illustrating a process of determining a final selected area that includes a target by using the image processing apparatus of FIG. 2. Referring to FIG. 4, an image processing apparatus may calculate a plurality of position offsets by applying a feature regression matrix to each of a plurality of candidate areas in operation 410, may calculate a target position offset by applying a respective weight to each of the plurality of position offsets in operation 420, and may determine a final selected area that includes a target by using the target position offset in operation 430.

In operation 410, the image processing apparatus may perform a feature regression to calculate a respective difference value between a position of a basis image in a first frame and a representative position of each candidate area in a second frame. The image processing apparatus may calculate a plurality of position offsets by applying a pre-trained feature regression matrix to each of the candidate areas.

For example, a representative position of a candidate area may be (x, y). In this example, the feature regression matrix H may be defined as a matrix "H=[h$_1$,h$_2$]" used to perform a feature regression on the representative position (x, y) to be in the basis image. The feature regression matrix may be a matrix that is determined based on differences in position between each respective one of the feature points in the basis image and each corresponding one of the feature points in the sample frame. A process of generating the feature regression matrix via machine learning will be described in detail with reference to the drawings below.

The image processing apparatus may calculate a position offset T$_i$ that corresponds to an candidate area X$_i$ (i=1, ..., N, N being a positive integer) based on a feature point q$_i$ included in the candidate area X$_i$ by applying Equation 1 below.

$$T_i = H^T \times q_i \quad \text{[Equation 1]}$$

In Equation 1, H$^T$ denotes a transposed matrix of the feature regression matrix. According to Equation 1, the image processing apparatus may calculate the respective position offset T$_i$ (i=1, ..., N, N being a positive integer) that corresponds to each of N sampled candidate areas.

A plurality of feature regression matrices H$_j$ (j=1, ..., M, M being a positive integer) may be previously determined based on a plurality of sample frames. In this example, the image processing apparatus may calculate a plurality of position offsets by repetitively applying the plurality of the feature regression matrices to each of the candidate areas. The image processing apparatus may calculate the respective position offset T$_i^j$ that corresponds to the candidate area X$_i$ by applying Equation 2 below.

$$T_i^j = H_j^T \times q_i \quad \text{[Equation 2]}$$

In Equation 2, q$_i$ denotes a feature point included in the candidate area X$_i$ (i=1, ..., N, N being a positive integer), and T$_i^j$ denotes a position offset calculated by applying a j$^{th}$ feature regression matrix to an i$^{th}$ candidate area X$_i$. In addition, in Equation 2, H$_j^T$ denotes a transposed matrix of the j$^{th}$ feature regression matrix. The image processing apparatus may calculate the i$^{th}$ position offset T$_i$ that corresponds to the i$^{th}$ candidate area X$_i$ by applying Equation 3 below.

$$T_i = \frac{1}{M} \sum_j T_i^j \quad \text{[Equation 3]}$$

The image processing apparatus may calculate an average value of position offsets calculated by using the plurality of feature regression matrices to calculate the i$^{th}$ position offset T$_i$ that corresponds to the i$^{th}$ candidate area X$_i$.

In operation 420, the image processing apparatus may calculate a target position offset for tracking the target by applying a respective weight to each of the plurality of position offsets T$_i$. The image processing apparatus may determine each respective weight based on a variance V$_i$ of the position offsets T$_i^j$ that correspond to the candidate area X$_i$. For example, a weight $\tilde{g}_i$ may be defined to be proportional to exp$\{-V_i\}$.

Further, the image processing apparatus may determine candidate areas that are adjacent to each other such that the candidate areas have similar weights. The image processing apparatus may calculate a weighting matrix g that minimizes a target function f(g), and determine the corresponding weight based on the weighting matrix g. The target function f(g) may be defined as shown in Equation 4 below.

$$f(g) = \tfrac{1}{2} g^T L g + \tfrac{1}{2} \lambda \| g - \tilde{g} \|^2 \quad \text{[Equation 4]}$$

m$_{ij}$ may be an overlapping rate between the i$^{th}$ candidate area X$_i$ and the j$^{th}$ candidate area X$_j$. The overlapping rate may indicate a ratio between a size of sharing area of the i$^{th}$ candidate area X$_i$ and the j$^{th}$ candidate area X$_j$ and a size of area occupied by at least one of the i$^{th}$ candidate area X$_i$ and the j$^{th}$ candidate area X$_j$. Q may be an N×N matrix that includes m$_{ij}$. When d$_i$ is $\Sigma_j$ m$_{ij}$, and when D is Diag $\{d_1, ..., d_N\}$, a Laplacian matrix L may be calculated by using "D−Q" in Equation 4. "g=[g$_1$, ... g$_N$]$^T$" may be a weighting matrix of a weight determined based on a position of each candidate area, and also be represented as "$\tilde{g}=[\tilde{g}_1, ..., \tilde{g}_N]^T$". Further, in Equation 4, the weighting matrix g may be defined to have elements, each being greater than or equal to zero (0).

In operation 420, the image processing apparatus may determine a post-feature-regression position of the candidate area based on the respective weight, the respective position offset, and the respective position of each of the candidate areas. The image processing apparatus may calculate the target position offset T for tracking the target by applying Equation 5 below.

$$T = \Sigma_i g_i (X_i^D + T_i) \quad \text{[Equation 5]}$$

In Equation 5, X$_i^D$ denotes a position vector that indicates a representative position of the i$^{th}$ candidate area X$_i$. In this example, a post-feature-regression position of the i$^{th}$ candidate area X$_i$ may be calculated by using "X$_i^D$+T$_i$". The image processing apparatus may calculate the target position offset T acquired after a total regression by using a weight g$_i$ that corresponds to each of the candidate areas.

In operation 430, the image processing apparatus may determine a final selected area that includes the target by using the target position offset T. The image processing apparatus may determine a post-regression position of each of the candidate areas based on the target position offset T. The image processing apparatus may determine a final selected area in a current frame by applying the calculated target position offset T to a position of a prestored basis image.

The image processing apparatus may store a second frame in which a final selected area is determined, in a memory. When the number of frames stored in the memory exceeds a threshold, the image processing apparatus may update the basis image by using the stored frame. The image processing apparatus may select a basis image to be updated, based on an assessment result value of a final selected area that corresponds to each of the stored frames.

Figure 5:
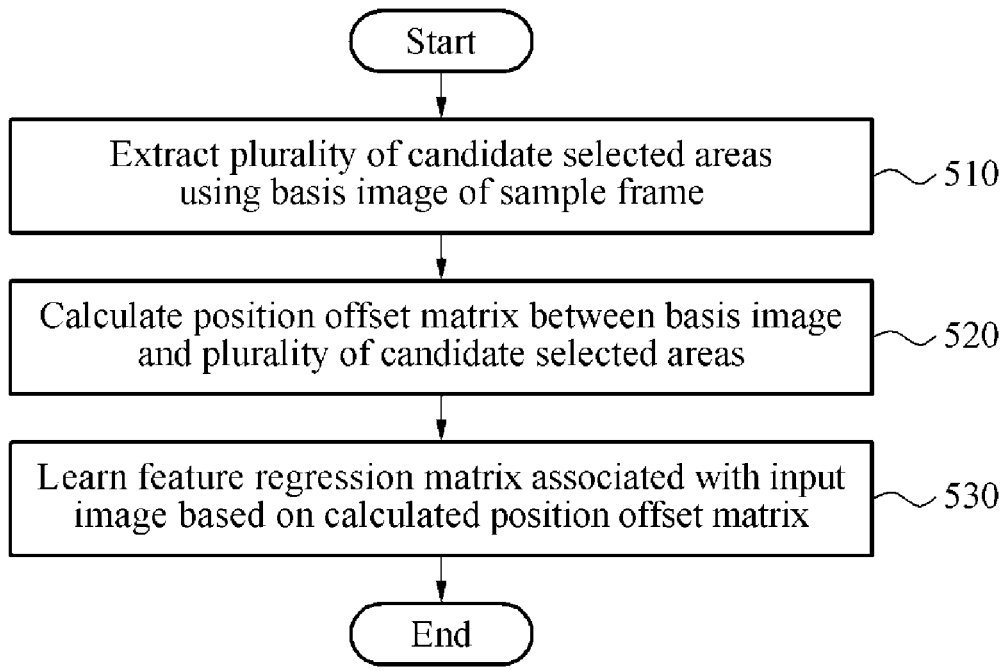
FIG. 5 is a flowchart illustrating a process of training an image processing apparatus on a feature regression matrix, according to an example embodiment.

FIG. 5 is a flowchart illustrating a process of training an image processing apparatus on a feature regression matrix, according to an example embodiment. Referring to FIG. 5, the image processing apparatus may extract a plurality of candidate areas by using a basis image of a sample frame in operation 510. The image processing apparatus may calculate a position offset matrix between the basis image and the plurality of candidate areas in operation 520. The image processing apparatus may determine a feature regression matrix associated with an input image based on the calculated position offset matrix in operation 530.

In operation 510, the image processing apparatus may extract a plurality of candidate areas by using a basis image of a sample frame. The image processing apparatus may sample N candidate areas of an adjacent area based on a position of a basis image. The image processing apparatus may extract the plurality of candidate areas such that a position distribution of a candidate area is based on an equal distribution or a Gaussian distribution.

The image processing apparatus may extract candidate areas, each having a set size. For example, a single candidate area may be defined as a 32-by-32 pixel block space. In addition, a size of a candidate area may be the same as a size of a prestored basis image.

In operation 520, the image processing apparatus may calculate a position offset matrix by using positions of the basis image and the plurality of candidate areas. The image processing apparatus may calculate a difference between a representative position of each of the plurality of candidate areas and a position of the basis image as a position offset. The representative position of the candidate area may be, for example, a position of a center point in the candidate area. The image processing apparatus may compare a representative position $(x_1, y_1)$ of a first candidate area to the position of the basis image in order to calculate a first position offset $(P_1^x, P_2^x)$. Likewise, the image processing apparatus may calculate a plurality of position offsets of an X coordinate and a plurality of position offsets of a Y coordinate that correspond to each of the plurality of candidate areas as "$P_1^x, \ldots, P_N^x$" and "$P_1^y, \ldots, P_N^y$", respectively. Further, the image processing apparatus may calculate a position offset matrix "$C=[C_1, C_2]$" by using the plurality of calculated position offsets. For example, $C_1$ and $C_2$ may be defined as $C_1=[P_1^x, \ldots, P_N^x]^T$, $C_2=[P_1^y, \ldots, P_N^y]^T$, respectively.

In operation 530, the image processing apparatus may determine a feature regression matrix associated with an input image based on the calculated position offset matrix. The image processing apparatus may apply the position offset matrix to respective feature points included in each of the candidate areas and feature points in the basis image in order to determine the feature regression matrix that corresponds to a sample frame and store the determined feature regression matrix.

The image processing apparatus may calculate a feature regression matrix $H(h_1, h_2)$ by minimizing a target function $f(H)$ by applying Equation 6 below.

$$f(H)=\Sigma_i(h_1^T q_i - P_i^x)^2 + \gamma\|h_1\|^2 + \Sigma_i(h_2^T q_i - P_i^y)^2 + \gamma\|h_2\|^2 \quad \text{[Equation 6]}$$

In Equation 6, a feature point that corresponds to the $i^{th}$ candidate area $X_i$ may be $q_i$, feature regression vectors for an X coordinate and a Y coordinate may be respectively $h_1$ and $h_2$, and $\gamma$ is a constant. The image processing apparatus may calculate the feature regression matrix H based on a logistic regression. The feature regression matrix H calculated by the image processing apparatus may be represented as shown in Equation 7 below.

$$H=(XX^T+\gamma I)^{-1}XC \quad \text{[Equation 7]}$$

In Equation 7, X denotes a matrix associated with a representative position of a candidate area and I denotes a unit matrix that has an element of one (1) on a diagonal line and remaining elements of zero (0) (also referred to herein as an "identity matrix"). The image processing apparatus may store a learned feature regression matrix in a memory.

The image processing apparatus may train M feature regression matrices by using M sample frames that vary from one another and store the M feature regression matrices. In this example, a single sample frame may correspond to a single feature regression matrix and M may be a positive integer greater than or equal to two (2). The image processing apparatus may increase a target tracking accuracy by effectively removing an outlier via the use of a plurality of feature regression matrices. The learned feature regression matrix with training may be used to track a target of a predetermined frame included in an input image. Since the descriptions of FIGS. 1, 2, 3A, 3B, and 4 are applicable here, repeated description about the target tracking process will be omitted for brevity.

Figure 6:
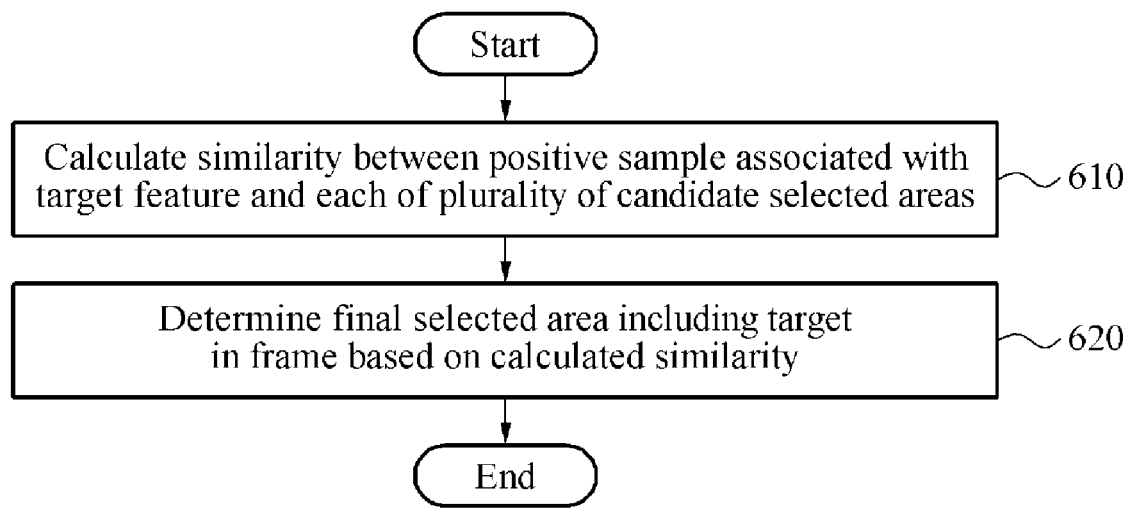
FIG. 6 is a flowchart illustrating a process of determining a final selected area that includes a target by using an image processing apparatus, according to an example embodiment.

FIG. 6 is a flowchart illustrating a process of determining a final selected area that includes a target by using an image processing apparatus, according to an example embodiment. Referring to FIG. 6, a method of determining a final selected area may include operation 610, in which a respective similarity between a positive sample associated with a target feature and each of a plurality of candidate areas is calculated, and operation 620, in which a final selected area that includes a target is determined in a frame based on each calculated similarity.

In operation 610, the image processing apparatus may calculate a respective similarity between the positive sample and each of the plurality of candidate areas by using a stored clustering model. The image processing apparatus may determine an initial selected area associated with the target in an input frame and extract a plurality of candidate areas based on the determined initial selected area. Since the descriptions of FIGS. 3A and 3B are applicable here, repeated description about a process in which the image processing apparatus extracts a plurality of candidate areas will be omitted for brevity.

The clustering model may include a positive sample matrix that is determined by extracting a feature of a target area in a basis image as a positive sample. Further, the clustering model may include a negative sample matrix that is determined by extracting a feature of an ambient area in a predetermined range based on the target area as a negative sample. For example, at least one of a gray image and a histogram of oriented gradients may be used as a feature of an image.

In operation 610, the image processing apparatus may calculate the respective similarity between the positive sample and each of the plurality of candidate areas by using an SSC model trained based on a plurality of basic sub-images. The SSC model may be implemented as, for example, a hybrid sparse subspace clustering model (HSSC) model that includes a positive sample matrix and a negative sample matrix.

In operation 610, the image processing apparatus may calculate respective similarities between feature points included in each candidate area and the positive sample matrix included in the HSSC model. Further, the image processing apparatus may calculate the similarities by comparing a feature point of a subarea included in the candidate area to the positive sample matrix. The image processing apparatus may add up similarities associated with a plurality of subareas included in each of the candidate areas.

The image processing apparatus may determine the similarity that corresponds to the candidate area based on a sum of the similarities associated with the plurality of subareas included in the candidate area. The image processing apparatus may calculate an average value of the similarities associated with the plurality of subareas as the similarity of the candidate area.

In operation 620, the image processing apparatus may determine the final selected area that includes the target in the frame based on the respective similarity that corresponds to each of the candidate areas. The image processing apparatus may determine a candidate area that has a maximum similarity with respect to a positive sample among the plurality of candidate areas, as a final selected area associated with the target. In addition, the image processing apparatus may store information that relates the determined final selected area as a target tracking result of a current frame. The information that relates to the final selected area may include at least one of, for example, a size of an area, a position of the area, data on an image in the area, and data on a feature in the image.

The image processing apparatus may compare the final selected area of the frame to previous frames stored in the memory. The image processing apparatus may compare an average similarity value of the previous frames with respect to the positive sample to the similarity of the final selected area with the positive sample. As a comparison result, when the similarity of the final selected area with respect to the positive sample is greater than the average similarity value of the previous frames with respect to the positive sample, the image processing apparatus may newly store a frame in which the final selected area is determined. Further, the image processing apparatus may newly store a basis image of a target in a frame that has a maximum similarity with respect to the positive sample among the prestored frames.

Figure 7A:
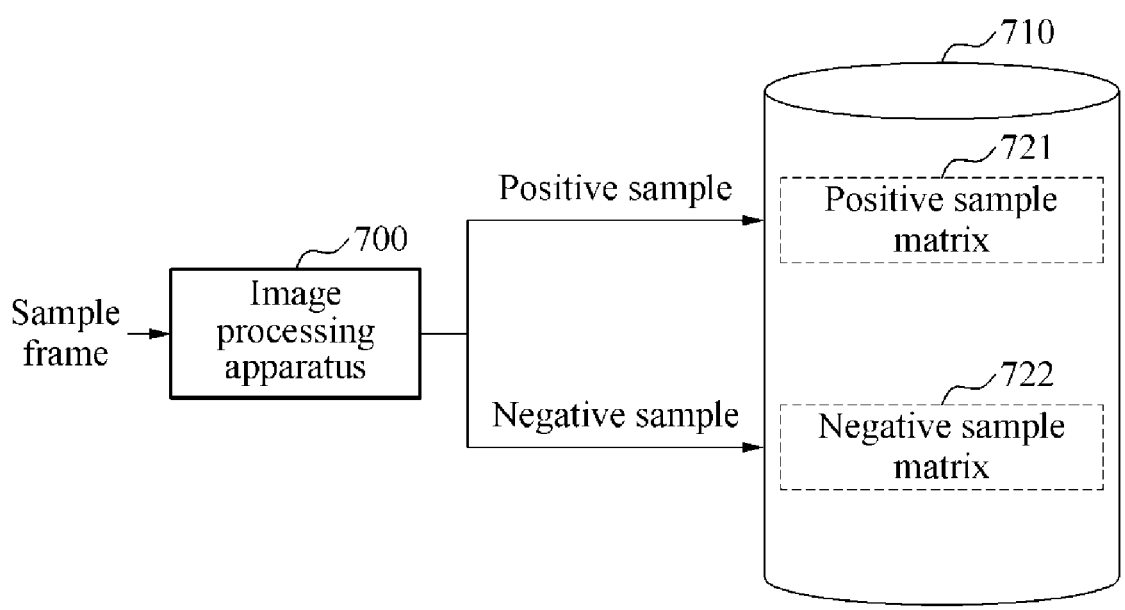
FIGS. 7A and 7B are diagrams illustrating a process of extracting a positive sample and a negative sample based on a sample frame by using an image processing apparatus, according to an example embodiment.
Figure 7B:
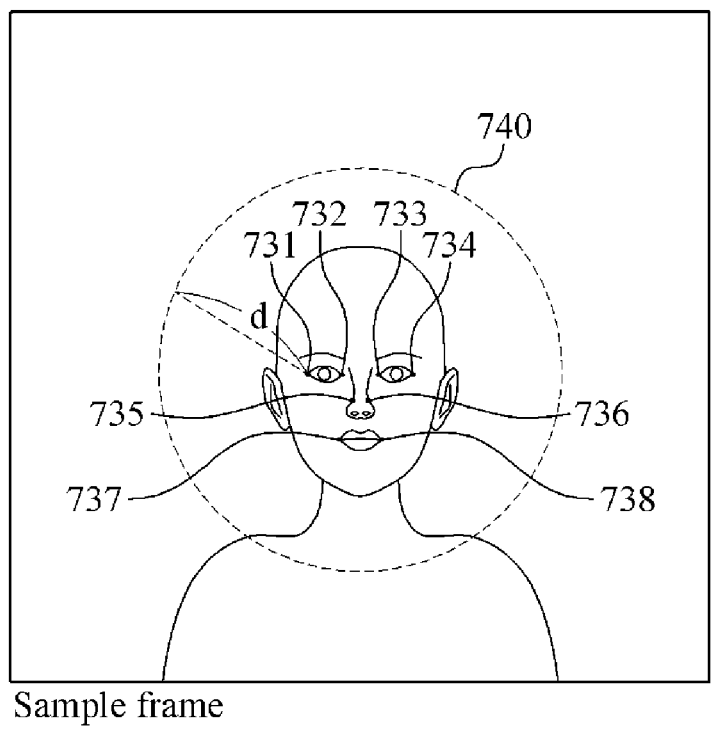

FIGS. 7A and 7B are diagrams illustrating a process of extracting a positive sample and a negative sample based on a sample frame by using an image processing apparatus, according to an example embodiment. Referring to FIG. 7A, an image processing apparatus 700 may receive a sample frame and output either a positive sample or a negative sample that corresponds to the sample frame. The image processing apparatus 700 may be previously trained to extract the positive sample or the negative sample from a determined sample frame. The image processing apparatus 700 may store a positive sample matrix 721 and a negative sample matrix 722 generated by using a sample frame in a memory 710 as a clustering model.

Referring to FIG. 7B, the image processing apparatus 700 may extract feature points 731, 732, 733, 734, 735, 736, 737, and 738 in an input sample frame as a positive sample. The image processing apparatus 700 may extract feature points such as a face contour point, an eye point, a mouth point, and the like of a target included in a basic image of a sample frame as the positive sample. Further, the image processing apparatus 700 may sample a plurality of pixel points in an area 740 within a predetermined distance d based on the feature points extracted as the positive sample, and may extract the plurality of pixel points as a negative sample. The predetermined distance d may be a parameter designated to distinguish between the positive sample and the negative sample.

Figure 8:
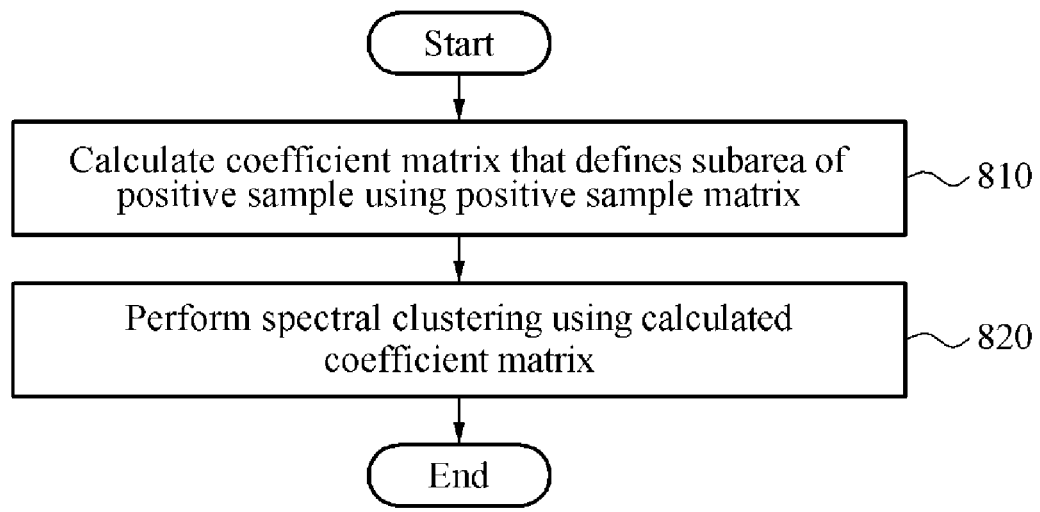
FIG. 8 is a flowchart illustrating a process of training the image processing apparatus of FIG. 7A on a sparse subspace clustering (SSC) model.

FIG. 8 is a flowchart illustrating a process of training the image processing apparatus of FIG. 7A on an SSC model. Referring to FIG. 8, the image processing apparatus 700 may calculate a coefficient matrix that defines a subarea of a positive sample by using a positive sample matrix in operation 810, and may perform spectral clustering by using the calculated coefficient matrix in operation 820.

In operation 810, the image processing apparatus 700 may optimize a production coefficient matrix by using a predetermined positive sample matrix. When N positive samples are provided, a positive sample may be $I_i^+$, for example, i=1, ..., N, and a positive sample matrix A may be defined as, for example, $A=[I_1^+, \ldots, I_N^+]$. In addition, when M negative samples are provided, a negative sample may be defined as $I_j^-$, for example, j=1, ..., M. Since the descriptions of FIGS. 7A and 7B are also applicable here, repeated descriptions about the process in which the image processing apparatus 700 extracts a positive sample from at least one sample frame and generating a positive sample matrix will be omitted for brevity.

In operation 810, the image processing apparatus 700 may optimize the production coefficient matrix based on a least squares regression (LSR) model. The image processing apparatus 700 may calculate an optimal production coefficient matrix W* by minimizing a target function f(W) in accordance with Equation 8 below.

$$f(W) = \|A - AW\|_F^2 + \lambda \|W\|_F^2 \quad \text{[Equation 8]}$$

In Equation 8, W denotes a production coefficient matrix, λ is a constant, and $\|\cdot\|_F$ denotes a matrix F. The image processing apparatus 700 may calculate the optimal production coefficient matrix W* that minimizes the target function defined f(W) by using Equation 8 according to Equation 9.

$$W^* = [A^T A + \lambda I]^{-1} A^T A \quad \text{[Equation 9]}$$

In Equation 9, $A^T$ denotes a transposed matrix of a positive sample matrix and $[A^T A + \lambda I]^{-1}$ may be an inverse matrix of $[A^T A + \lambda I]$. The image processing apparatus 700 may calculate a mixing coefficient matrix B by applying the calculated optimal production coefficient matrix W* to Equation 10.

$$B = (|W^*| + |(W^*)^T|) \quad \text{[Equation 10]}$$

In operation 820, the image processing apparatus 700 may perform the spectral clustering by using the calculated coefficient matrix. The image processing apparatus 700 may perform spectral clustering on the generated mixing coefficient matrix B and acquire a plurality of positive sample groups.

The image processing apparatus 700 may repetitively perform the spectral clustering on the mixing coefficient matrix B by the preset number of times and acquire the plurality of positive sample groups. The image processing apparatus 700 may perform the spectral clustering until N positive samples are clustered into K positive sample groups, K being an integer less than or equal to N. The spectral clustering process is well-known to persons having ordinary skill in the art and thus, related description will be omitted.

The image processing apparatus 700 may count the number of times that the spectral clustering is performed on the mixing coefficient matrix B as an index and determine whether to repeat the spectral clustering based on the counted index. When the spectral clustering is repeated K times with respect to the mixing coefficient matrix B, the image processing apparatus 700 may store a positive sample group generated in a $K^{th}$ spectral clustering operation in the HSSC model and terminate the repeating of the spectral clustering.

The image processing apparatus 700 may calculate an identifiability coefficient matrix that determines whether to repeat the spectral clustering using the positive sample group and the negative sample. The image processing apparatus 700 may extract a positive sample and a negative sample that correspond to a predetermined $k^{th}$ positive sample group as a single sample group. The image processing apparatus 700 may acquire an identification direction $p_k$ that corresponds to the positive sample in the sample group based on a predetermined graph embedding model. Hereinafter, a graph embedding model may indicate a method of mapping a graph to another graph.

The image processing apparatus 700 may determine a weight of samples based on a Euclidean distance of a positive sample and a negative sample included in a sample group. For example, a $k^{th}$ group may include a positive sample $I_i^+$ and a negative sample $I_j^-$. In this example, the image processing apparatus 700 may calculate a Euclidean distance between two samples as $d_{ij}$, and calculate a weight $\exp\{-d_{ij}\}$ based on the Euclidean distance $d_{ij}$. When the two samples are positive samples or negative samples, the image processing apparatus 700 may calculate a weight between the two samples as zero (0). Further, the image processing apparatus 700 may calculate a Laplacian matrix used for the graph embedding based on the calculated weight and acquire the identification direction $p_k$ based on the Laplacian matrix.

The image processing apparatus 700 may determine a similarity between the positive sample and an average value of the positive sample group based on the identification direction $p_k$ of each sample group. The image processing apparatus 700 may calculate a similarity $l_i^k$ between a positive sample $I_i^+$ and an average value $\bar{I}_k$ of a positive sample group by applying Equation 11.

$$l_i^k = \exp\{-|p_k^T(I_i^+ - \bar{I}_k)|\}$$ [Equation 11]

Further, the image processing apparatus 700 may calculate an identifiability coefficient matrix based on the similarity $l_i^k$ calculated by using Equation 11. The image processing apparatus 700 may calculate a similarity coefficient $\tilde{w}_{ij}$ based on an identifiability between the positive sample $I_i^+$ and a positive sample $I_j^+$ by applying Equation 12.

$$\tilde{w}_{ij} \propto \max\{l_i^1 l_j^1, \ldots, l_i^K l_j^K\}$$ [Equation 12]

In Equation 12 $I_i^1$ denotes a similarity between the positive sample $I_i^+$ and an average value $\bar{I}_1$ of a first positive sample group and $I_j^1$ denotes a similarity between the positive sample $I_j^+$ and an average value $\bar{I}_1$ of the first positive sample group. In addition, the image processing apparatus 700 may acquire an identifiability coefficient matrix $\tilde{W}$ by using the similarity coefficient $\tilde{w}_{ij}$ calculated using Equation 12 as an element.

The image processing apparatus 700 may verify the number of positive samples included in each positive sample group. When the verified number of positive samples is less than a threshold, the image processing apparatus 700 may determine that a positive sample group that corresponds to a positive sample is in a vacancy state.

The image processing apparatus 700 may add a positive sample to the first sample group that is in the vacancy state. When a similarity between a positive sample in a second positive sample group and the first positive sample group is greater than or equal to a threshold, the image processing apparatus 700 may add the positive sample to the positive sample group. The image processing apparatus 700 may repetitively add a positive sample such that the number of positive samples in the first sample group is greater than or equal to the threshold.

The image processing apparatus 700 may acquire the mixing coefficient matrix B by using the optimal production coefficient matrix W* and the identifiability coefficient matrix $\tilde{W}$ in accordance with Equation 13.

$$B = \alpha(|W^*| + |(W^*)^T|) + (1-\alpha)\tilde{W}$$ [Equation 13]

In Equation 13, $\alpha$ denotes a constant. The image processing apparatus 700 may perform the spectral clustering on the mixing coefficient matrix B and generate a respective positive sample group that corresponds to each spectral clustering operation. The image processing apparatus 700 may perform the spectral clustering on the mixing coefficient matrix B until the number of times that the spectral clustering is repeated reaches a predefined threshold.

The image processing apparatus 700 may perform a principal component analysis (PCA) for each of the generated positive sample groups and acquire a subarea of the corresponding positive sample group. The subarea of the positive sample group may be included in the HSSC model.

Further, the subarea may include an average value of positive samples included in the subarea.

The image processing apparatus 700 may generate a clustering model by using a positive sample associated with a target. In addition, the image processing apparatus 700 may generate an HSSC model that corresponds to a subarea in a positive sample. Using the HSSC model, the image processing apparatus 700 may achieve a robustness to image noise and increase accuracy on tracking a moving target. The HSSC model may be determined by using a plurality of sample frames based on an Euclidean distance between the positive sample associated with a feature of the target and a negative sample associated with a feature of an area that is adjacent to the target.

The image processing apparatus 700 may update the HSSC model. The image processing apparatus 700 may determine whether the number of frames stored in a memory is greater than a preset threshold. In this aspect, each of the frames may be, for example, a frame in which the final selected area is determined. When the number of the stored frames is greater than the threshold, the image processing apparatus 700 may extract a new sample frame from an input image and update the HSSC model by using the extracted sample frame. The image processing apparatus 700 may extract a subarea of a positive sample group based on the extracted sample frame.

Further, the image processing apparatus 700 may update the basis image based on the extracted sample frame. The image processing apparatus 700 may perform target tracking on a subsequently input frame by using the updated basis image and the HSSC model. Since the description of FIG. 6 is also applicable here, repeated description about the process in which the image processing apparatus 700 tracks a target will be omitted for brevity.

Figure 9:
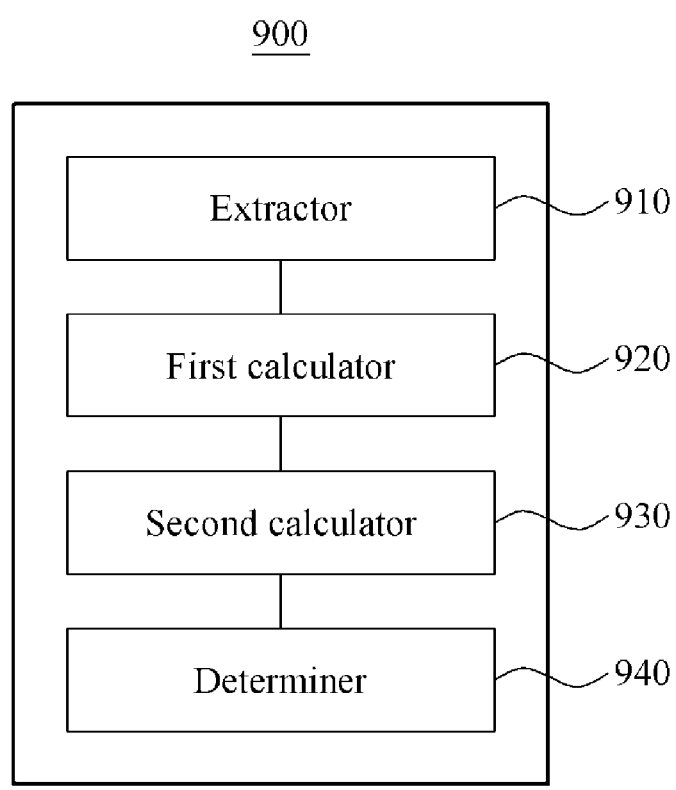
FIG. 9 is a block diagram illustrating an image processing apparatus, according to an example embodiment.

FIG. 9 is a block diagram illustrating an image processing apparatus, according to an example embodiment. Referring to FIG. 9, an image processing apparatus 900 may include an extractor 910, a first calculator 920, a second calculator 930, and a determiner 940. The extractor 910 may extract a plurality of candidate areas from an input image by using a basis image. The basis image may be an image of an area that includes a target in a frame stored in the image processing apparatus 900. The basis image may be included in a first frame of the input image that includes the target. Further, the basis image may be included in a predetermined frame of the input image as a final selected area in which the target is tracked by the image processing apparatus 900.

The first calculator 920 may track the target based on respective feature points included in each of the plurality of candidate areas. The first calculator 920 may calculate a plurality of position offsets by applying a feature regression matrix to each of the plurality of candidate areas. In addition, the first calculator 920 may calculate a target position offset by applying a respective weight to each corresponding one of the plurality of calculated position offsets.

The second calculator 930 may calculate a respective similarity between a positive sample associated with a target feature and each of the plurality of candidate areas. The second calculator 930 may calculate each respective similarity by using an HSSC model. The HSSC model may be trained by using a positive sample associated with the target and a negative sample associated with an area that is adjacent to the target. The second calculator 930 may calculate a similarity between a subarea included in a candidate area and a positive sample by applying Equation 14.

$$L_r^k = \exp\{-\|(I-\bar{I}) - U_k U_k^T(I-\bar{I})\|^2\}$$ [Equation 14]

In Equation 14, $U_k$ denotes a $k^{th}$ partial space included in the HSSC model, I denotes a feature of a positive sample included in each partial space, $\bar{I}$ denotes a feature average value of positive samples included in each partial space, and r denotes an index of a subarea in a candidate area. I may represent, for example, a brightness value of the positive sample.

Further, when a partial space among partial spaces included in the HSSC model has a maximal similarity with an $r^{th}$ subarea, the second calculator 930 may determine the maximal similarity as a similarity that corresponds to the $r^{th}$ subarea. The second calculator 930 may calculate the similarity that corresponds to the $r^{th}$ subarea by applying Equation 15.

$$L_r = \max_k L_r^k \quad \text{[Equation 15]}$$

The second calculator 930 may add up respective similarities that correspond to all subareas included in an $i^{th}$ candidate area $X_i$ so as to calculate a similarity that corresponds to the $i^{th}$ candidate area $X_i$ by applying Equation 16.

$$L(X_i) = \Sigma_r L_r \quad \text{[Equation 16]}$$

The determiner 940 may apply a first weight to the target position offset and apply a second weight to a respective similarity that corresponds to each of the plurality of candidate areas in order to determine a final selected area that includes the target. The determiner 940 may calculate assessment information that corresponds to the final selected area by applying Equation 17.

$$\tilde{X} = \beta X^S + (1-\beta) X^R \quad \text{[Equation 17]}$$

In Equation 17, $X^S$ denotes a maximal similarity of a candidate area, $X^R$ denotes a target position offset, $\beta$ denotes a weight coefficient, and $\tilde{X}$ denotes assessment information of a final selected area that includes a target, $\beta$ being a real number greater than zero (0) and less than one (1).

The above-described example embodiments may be recorded in non-transitory computer-readable media that include program instructions to implement various operations which may be performed by a computer. The media may also include, alone or in combination with the program instructions, data files, data structures, and the like. The program instructions recorded on the media may be those specially designed and constructed for the purposes of the example embodiments, or they may be of the well-known kind and available to persons having ordinary skill in the computer software arts. Examples of non-transitory computer-readable media include magnetic media such as hard disks, floppy disks, and magnetic tape; optical media such as compact disc—read-only memory (CD ROM) discs and digital versatile discs (DVDs); magneto-optical media such as optical discs; and hardware devices that are specially configured to store and perform program instructions, such as read-only memory (ROM), random access memory (RAM), flash memory, and the like. The media may include transfer media such as optical lines, metal lines, or waveguides including a carrier wave for transmitting a signal designating the program command and the data construction. Examples of program instructions include both machine code, such as code produced by a compiler, and files containing higher level code that may be executed by the computer using an interpreter. The described hardware devices may be configured to act as one or more software modules in order to perform the operations of the above-described example embodiments, or vice versa.

The foregoing example embodiments are examples and are not to be construed as limiting. The present disclosure can be readily applied to other types of apparatuses. Also, the description of the example embodiments is intended to be illustrative, and not to limit the scope of the claims, and many alternatives, modifications, and variations will be apparent to persons having ordinary skill in the art.

What is claimed is:

1. An image processing apparatus comprising:
a memory configured to store one or more instructions; and
a processor configured to execute the one or more instructions to:
calculate a respective first position offset for each of a plurality of candidate areas in a second frame based on a position of a basis image in a first frame;
determine a final selected area that includes a target in the second frame based on a respective weight allocated to each of the plurality of candidate areas and the calculated respective first position offset; and
track the target in the second frame based on the determined final selected area,
wherein the processor is further configured to calculate a plurality of second position offsets for a first candidate area by using a plurality of predetermined feature regression matrices, and to calculate the first position offset that corresponds to the first candidate area by using an average value of the plurality of second position offsets.

2. The image processing apparatus of claim 1, wherein the processor is further configured to determine each respective weight based on a respective position of each corresponding one of the plurality of candidate areas in the second frame.

3. The image processing apparatus of claim 1, wherein the processor is further configured to calculate the plurality of second position offsets by applying a feature regression matrix to each of the plurality of candidate areas, and to calculate a target position offset for tracking the target by applying each respective weight to each corresponding one of the plurality of second position offsets.

4. The image processing apparatus of claim 1, wherein the plurality of predetermined feature regression matrices is determined based on a respective third position offset that corresponds to a respective feature point of each of a plurality of sample frames and a feature point in the basis image.

5. The image processing apparatus of claim 1, further comprising an extractor configured to determine an initial selected area associated with the target in the second frame based on the basis image in the first frame and to extract the plurality of candidate areas based on the determined initial selected area.

6. The image processing apparatus of claim 5, wherein the extractor is further configured to calculate an overall position offset between the first frame and the second frame and to determine the initial selected area based on the calculated overall position offset and information that relates to a position at which the target is present in the basis image.

7. The image processing apparatus of claim 6, wherein the extractor is further configured to extract, from the second frame, respective projection points that correspond to feature points in the basis image and to determine the overall position offset by using a respective texture value of each of a plurality of first points in a predetermined range and the extracted projection points.

8. The image processing apparatus of claim 7, wherein the extractor is further configured to extract the plurality of first points in the predetermined range based on the extracted projection points, to determine matching points that correspond to feature points based on a respective similarity between a texture value of each corresponding one of the extracted plurality of first points and a texture value of each of the feature points, and to determine the overall position offset by comparing a respective position of each of the feature points with a respective position of each of the matching points.

9. The image processing apparatus of claim 1, further comprising a storage configured to store the second frame in which the final selected area is determined and to update, when a number of stored frames is greater than or equal to a threshold, the basis image based on a target tracking result value of the stored frames.

10. The image processing apparatus of claim 1, wherein the processor is further configured to calculate the respective first position offset for each of the plurality of candidate areas in the second frame based on a feature point in each of the plurality of candidate areas in the second frame.

\* \* \* \* \*